(12) United States Patent
Cocco et al.

(10) Patent No.: US 9,113,751 B2
(45) Date of Patent: Aug. 25, 2015

(54) MACHINE FOR THE PREPARATION OF BEVERAGES

(75) Inventors: Alessandro Cocco, Turin (IT); Alfredo Faccinti, San Francesco Al Campo (IT)

(73) Assignee: LUIGI LAVAZZA S.P.A., Turin (IT)

( * ) Notice: Subject to any disclaimer, the term of this patent is extended or adjusted under 35 U.S.C. 154(b) by 677 days.

(21) Appl. No.: 12/989,011

(22) PCT Filed: Apr. 21, 2009

(86) PCT No.: PCT/IB2009/051625
§ 371 (c)(1),
(2), (4) Date: Oct. 21, 2010

(87) PCT Pub. No.: WO2009/130661
PCT Pub. Date: Oct. 29, 2009

(65) Prior Publication Data
US 2011/0030564 A1    Feb. 10, 2011

(30) Foreign Application Priority Data

Apr. 22, 2008  (IT) .............................. TO2008A0311

(51) Int. Cl.
*A47J 31/00*     (2006.01)
*A47J 43/044*    (2006.01)
(Continued)

(52) U.S. Cl.
CPC ............ *A47J 43/044* (2013.01); *A47J 31/3671* (2013.01); *A47J 31/4489* (2013.01); *A47J 31/46* (2013.01); *A47J 43/126* (2013.01)

(58) Field of Classification Search
USPC ........ 99/284, 287, 290, 291, 293, 295, 302 C
See application file for complete search history.

(56) References Cited

U.S. PATENT DOCUMENTS 4,039,771 A * 8/1977 Thorsoe et al. ............... 392/480
5,207,148 A * 5/1993 Anderson et al. ............... 99/281
(Continued)

FOREIGN PATENT DOCUMENTS

CA          2048631 A1    9/1990
DE       102004063285 A1    7/2006
(Continued)

*Primary Examiner* — Dana Ross
*Assistant Examiner* — Brandon Harvey
(74) *Attorney, Agent, or Firm* — Sughrue Mion, PLLC

(57) ABSTRACT

The machine (M) comprises
  electric heaters (15, 42) suitable to heat an amount of water for preparing hot beverages to a preset temperature;
  a first unit (1) for preparing and delivering a first hot beverage, particularly coffee, including
  a bearing structure (3) wherein at least one extraction assembly (4) is mounted which is suitable to accommodate a capsule or pod containing a substance for preparing the first beverage, particularly roasted ground coffee, and an underlying movable dispenser (21, 22) which is capable of taking at least first and second delivery positions, and
  a second unit (2) for preparing a beverage by means of centrifugation, which is arranged adjacent the first unit (1) and including
  a vessel (26) to receive an amount of the first beverage from the dispenser (21, 22) of the first unit (1), when this dispenser (21, 22) is in a preset delivery position, and optional further substances, and
  a motor-driven centrifuge assembly (28) including a stirring member (36) suitable to be introduced into this vessel (26) and be operated therein to stir the contents thereof, the stirring member (36) having a longitudinal duct (39), the outlet thereof ending within the vessel (26).

9 Claims, 2 Drawing Sheets

(51) Int. Cl.
*A47J 31/36* (2006.01)
*A47J 31/44* (2006.01)
*A47J 31/46* (2006.01)
*A47J 43/12* (2006.01)

(56) References Cited

U.S. PATENT DOCUMENTS 5,476,033 A * 12/1995 Locati ............................. 99/279
5,992,298 A * 11/1999 Illy et al. ........................ 99/281
6,626,086 B2 * 9/2003 Eugster ........................ 99/323.1
7,066,079 B2 * 6/2006 Sager .............................. 99/280
2004/0031394 A1 * 2/2004 Yoakim et al. ................. 99/279

FOREIGN PATENT DOCUMENTS

| DE | 102006043903 B3 | | 2/2008 |
| EP | 1197175 A1 | | 4/2002 |
| EP | 1854384 A1 | | 11/2007 |
| JP | 2008012474 A | * | 1/2008 |

* cited by examiner

MACHINE FOR THE PREPARATION OF BEVERAGES

CROSS REFERENCE TO RELATED APPLICATIONS

This application is a National Stage of International Application No. PCT/IB2009/051625, filed on Apr. 21, 2009, which claims priority from Italian Patent Application No. TO2008A000311, filed on Apr. 22, 2008, the contents of all of which are incorporated herein by reference in their entirety.

The present invention relates to a machine for preparing beverages.

An object of the invention is to provide a machine suitable to allow preparing a plurality of beverages, such as expresso coffee, the so-called "cappuccino", etc., with improved characteristics.

These and other objects are achieved according to the invention with a machine comprising
- electric heating means suitable to heat an amount of water for preparing beverages to a predetermined temperature;
- a first unit for preparing and delivering a first hot beverage, particularly coffee, including
- a bearing structure in which at least one extraction assembly suitable to accommodate a capsule or pod containing a substance for preparing said first beverage, particularly roasted ground coffee, and an underlying movable dispenser which is capable of taking at least first and second delivery positions is mounted; and
- first pump means connected to said heating means and suitable to supply a water flow to said extraction assembly of the first unit; and
- a second unit for preparing a second beverage by means of centrifugation, which is arranged adjacent said first unit, and including
- a vessel suitable to receive an amount of said first beverage from the dispenser of said first unit when this dispenser is in a preset position, and further optional substances,
- a motor-driven centrifuge assembly including a stirring member suitable to be introduced within said vessel and rotatably driven therein to stir the contents thereof, said stirring member having a longitudinal duct, the outlet thereof ending within said vessel; and
- second pump means connected to said heating means and selectively operable to supply a hot steam flow at the inlet of the longitudinal duct of said stirring member.

Further characteristics and advantages of the invention will result from the detailed description below, which is given as a non-limiting example, with reference to the annexed drawings, in which.

Figure 1:
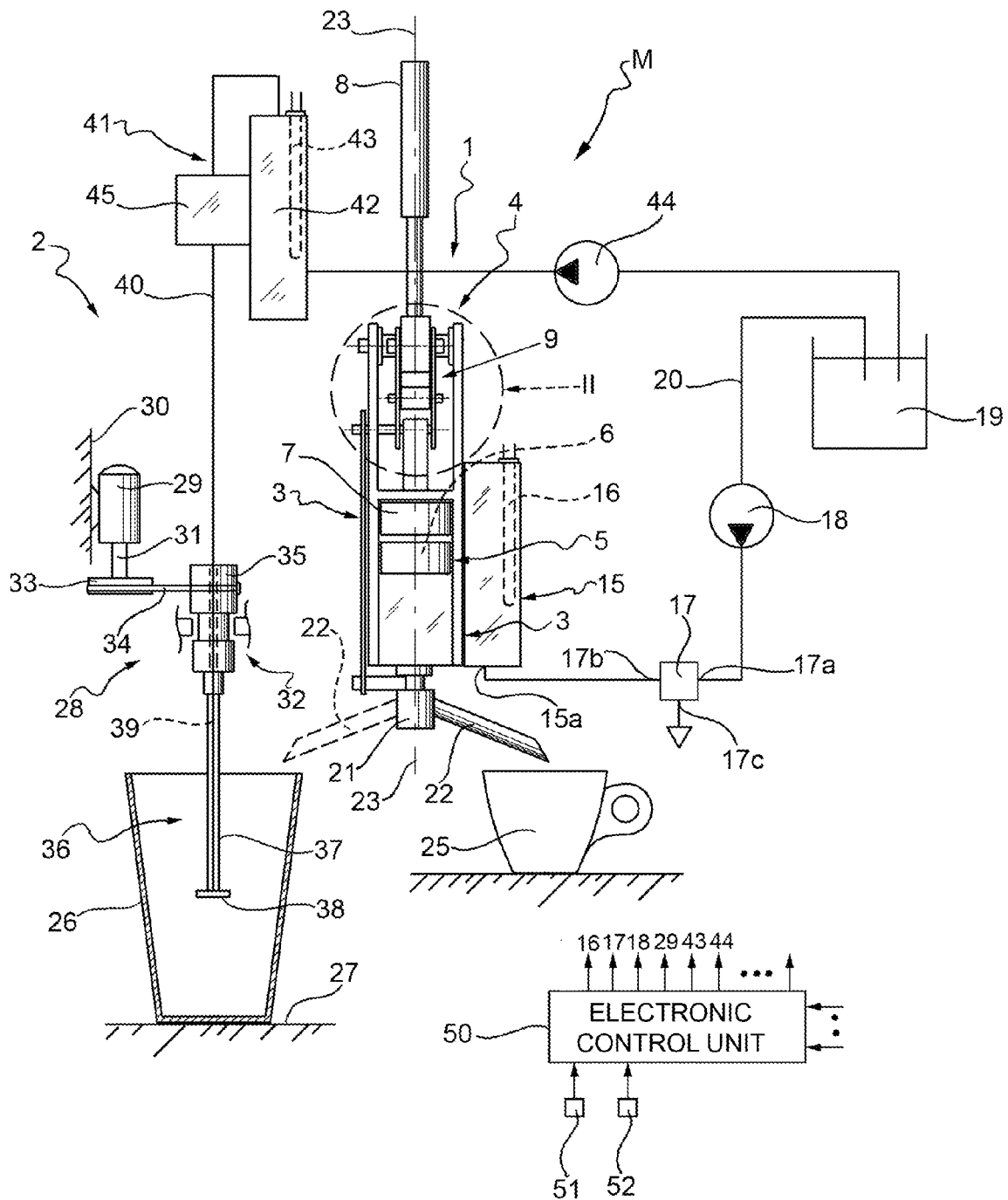
FIG. 1 is a partially schematic illustration of a machine for preparing beverages according to the present invention.

In FIG. 1 with M has been generally designated a machine for preparing beverages according to the present invention.

The machine M essentially comprises first and second units, which are designated 1 and 2, respectively, for preparing respective beverages.

The unit 1 is intended for preparing and delivering a first hot beverage, particularly expresso coffee, whereas the second unit 2 is intended to prepare a second beverage such as the so-called "cappuccino".

The first unit 1 comprises a bearing structure 3, operatively stationary, in which (at least) one extraction assembly 4, known per se, is mounted, including a lower body 5, wherein a housing 6 is defined which is suitable to accommodate a capsule or pod containing a substance for preparing a first beverage, such as roasted ground coffee. The extraction assembly 4 further comprises a movable part 7 which can be vertically moved relative to the body 5, by means of a manually-operated lever 8 and a motion transmission mechanism 9 which is, in the example illustrated herein, of the so-called toggle type.

Figure 3:
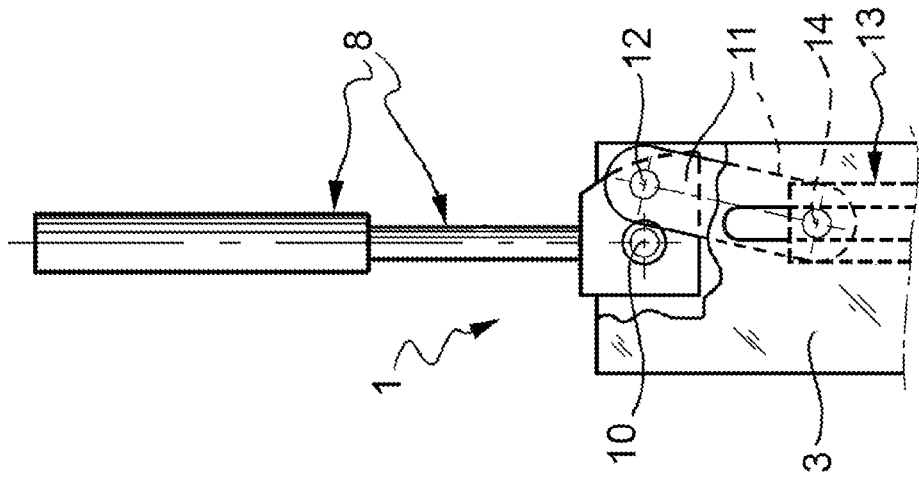
FIG. 3 is a partial side view according to the arrow III in FIG. 2.
Figure 2:
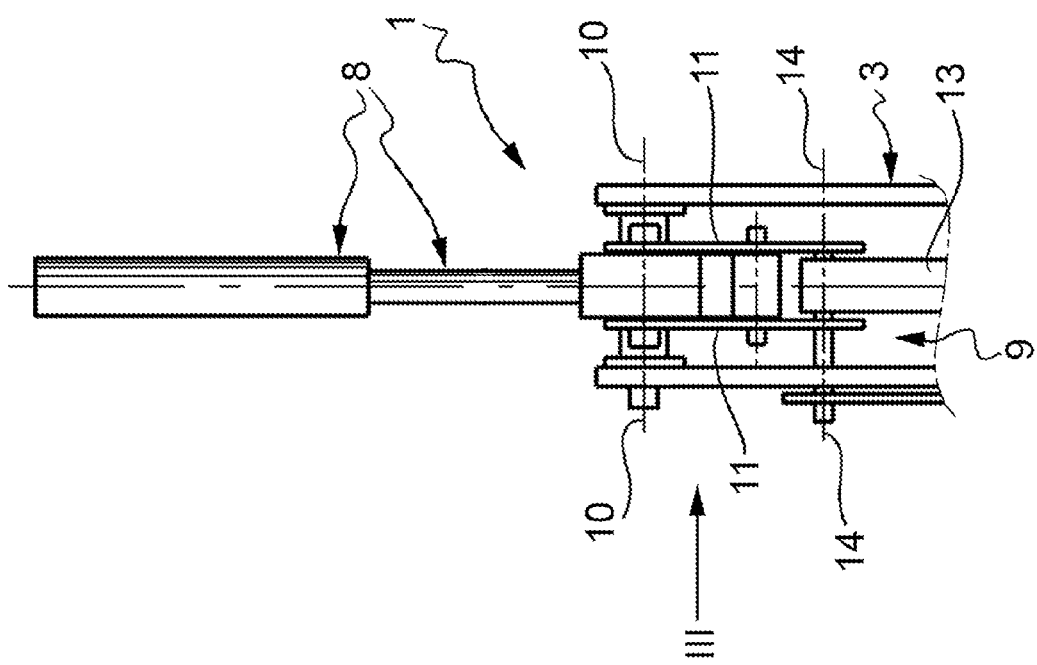
FIG. 2 is an enlarged scale view of a detail designated II in FIG. 1.

In the exemplary embodiment illustrated herein (particularly in FIGS. 2 and 3), the control lever 8 is pivoted about a horizontal axis 10 on the bearing structure, and is pivotally connected to a couple of rods 11 about an axis 12 (FIG. 3) parallel to axis 10. The rods 11 are, in turn, pivoted on a slide 13 about a horizontal axis 14 parallel to the axes 10 and 12. The slide 13 can be vertically moved along guide slots and is connected to the movable body 7 of the extraction assembly.

The above-described motion mechanism is just one possible exemplary embodiment. Other motion mechanisms, and generally other extraction assemblies, other than the one described herein can be used, for example the extraction assembly as described in European patent application EP 1 854 384 A1 from the same Applicant.

With reference to FIG. 1, to the bearing structure 3, preferably of a metal material, an electric heater 15 of the so-called instant type is preferably fixed, which is suitable to heat a water flow passing therethrough to a predetermined temperature. This heater 15 comprises at least one electric resistor 16 and has the inlet 15a connected to an outlet 17b of a three-way electrovalve 17.

The electrovalve 17 has an inlet 17a connected to the outlet or delivery of a pump 18, for example an electric vibration pump, the suction side thereof being connected to a water tank 19 by means of a piping 20.

The three-way electrovalve 17 has further a discharge outlet 17c.

The instant electric heater 15 has the outlet connected to, in a manner not illustrated, the work chamber of the extraction assembly 4, a capsule or pod to prepare the first beverage being arranged therein.

The extraction assembly 4 has a dispenser 21 arranged therebelow which in the example illustrated therein comprises a delivery spout 22 inclined downwards.

The dispenser 21 is mounted pivotally about a vertical axis 23, and is capable of being arranged in (at least) first and second delivery positions, which are illustrated in solid lines, and dotted lines in FIG. 1, respectively.

In the first delivery position, the dispenser 21, 22 is capable of pouring the beverage provided with the extraction assembly 4 in a vessel 25 arranged therebelow, such as a coffee cup.

In the second delivery position, the dispenser 21 and the spout 22 associated thereto are capable of co-operating with the second unit 2 of the machine M in the manner that will be described herein below.

The second unit 2 of the machine comprises a vessel 26 opened on top, which is operatively positioned on a stationary support surface 27.

The vessel 26 is suitable to receive, from the dispenser 21, 22 of the first unit 1 of the machine, an amount of the first beverage, for example expresso coffee, after this dispenser has been brought to above-said second work position, as shown in dotted lines in FIG. 1.

In the vessel 26 optional further substances can be added, for example hot or cold milk, etc., for the preparation of a second beverage, for example a so-called "cappuccino".

Above the vessel 26 the second unit 2 of the machine M comprises a motor-driven centrifuge assembly generally designated 28. In the embodiment illustrated herein, this assembly 28 comprises an electric motor 29, fixed to a stationary bearing structure 30, and having a vertical shaft 31, coupled to a centrifuge 32, by means of a pulley 33 fixed to the shaft and drive belt 34 associated therewith.

The centrifuge 32 essentially comprises an upper hub 35 pivotally mounted about a vertical axis, and capable of being rotatably driven by the motor 39 by means of the belt 34.

A stirring member 36 is connected below the hub 35, which includes a stem 37, co-axial with the hub 35. At the lower end of the stem 37 is connected a centrifuge impeller 38, which in the exemplary embodiment illustrated herein is simply disc-shaped. In alternative embodiments, the impeller 38 may be of a conical shape, and may or may not be provided of blades.

In the hub 35 and in the stem 37 connected thereto, a passageway or axial duct is provided, which is designated 39 in FIG. 1, which ends in the bottom of the vessel 26, through the impeller 38.

At the upper end, the duct or passageway 39 is connected by means of a piping 40 to the outlet of a heating assembly generally designated 41. This assembly comprises an electric heater 42 of the so-called instant type, similar to the above-described electric heater 15, and including at least one heating resistor 43.

The instant heater 42 has the inlet thereof connected to the outlet or delivery of a second pump 44, which is also of the electric vibration type, the suction side thereof being connected to the water tank 19.

The outlet of the instant heater 42 is connected to the inlet of a further heat exchanger 45, the body thereof being fixed in a heat exchange relationship to the instant heater 42 body.

The outlet of the heat exchanger 43 is connected to the inlet end of the passageway or duct 39 of the centrifuge 32.

The machine M further comprises control electronic unit, designated 50 in FIG. 1. This unit is arranged to drive according to preset conditions the operation of the machine M, and particularly the pumps 18, 44, the heating resistors 16, 43, the discharge electrovalve 17 and the electric motor 29.

The control unit 50 can be further connected to optional further actuating devices, for example an actuator suitable to cause the dispenser 21 to rotate, and sensors with which the machine M is provided, for example temperature and pressure sensors, as well as a level sensor which is optionally associated with the water tank 19.

Manually-operated actuation/selection devices 51, 52 are further connected to the control unit 50.

The machine M has a very versatile operating configuration.

In a first usage mode, only the first unit is used, for preparing and delivering a first hot beverage, for example express coffee.

In a second usage mode, both units 1 and 2 are used, to prepare a second beverage, for example the so-called "cappuccino", using an amount of the first beverage, prepared with unit 1 and poured into the vessel 26 of unit 2 by means of the dispenser arranged in the position illustrated with a dotted line in FIG. 1. To this first beverage amount at least one further ingredient may be added, for example milk, hot or cold, and the mixture thus-obtained in the vessel 26 can be "whipped" by means of the motor-driven centrifuge assembly 28.

The second unit 2 can be however used independently of the first unit 1, to prepare other types of beverages, for example of the so-called "milk shake", with ingredients being directly poured in the vessel 26, not using any beverage prepared by unit 1.

In another embodiment, not shown, the machine M can comprise, instead of the instant heaters 15 and 42, (at least) one pressure boiler, to produce hot water and/or steam for the first unit 1 and hot steam for the second unit 2.

Obviously, the finding principle being understood, the embodiments and the details thereof may be widely changed relative to what has been described and illustrated herein by way of non-limiting example, without however departing from the scope of the invention as defined in the annexed claims.

The invention claimed is:

1. A machine for preparing beverages, comprising,
    an electric heating unit for heating an amount of water to a preset temperature for preparing hot beverages, having a first heater and a second heater;
    a first unit, for preparing and delivering a first hot beverage, including:
        a bearing structure wherein at least one extraction assembly is mounted which is suitable to accommodate a capsule or pod containing a substance to prepare said first beverage, and an underlying pivotally movable dispenser which is configured to take at least first and second delivery positions,
        a first pump connected to said first heater and configured to supply a water flow to the extraction assembly of said first unit; and
    a second unit, for preparing a beverage by centrifugation, which is arranged adjacent said first unit and including:
        a vessel for receiving from the dispenser of the first unit an amount of said first beverage, when said dispenser is in a preset delivery position,
        a motor-driven centrifuge assembly comprising a motor coupled by a transmission to a stirring member configured to be introduced into said vessel and be rotatably operated therein to stir the contents thereof, said stirring member having a longitudinal duct, the outlet thereof ending within said vessel,
        a second pump connected to said second heater and selectively operable to supply a hot steam flow to the inlet of the longitudinal duct of said stirring member through said transmission,
    wherein the first heater is associated with said first unit and configured to heat a water flow passing therethrough to a preset temperature, and said second heater associated with said second unit and configured to convert a water flow passing therethrough to steam.

2. The machine according to claim 1, wherein said first heater is an instant electric heater and said second heater is an instant electric heater.

3. The machine according to claim 2, wherein said first heater is fixed to said bearing structure.

4. The machine according to claim 2, wherein the second heater has the outlet thereof connected to a further heat exchanger which is connected to said second heater in a heat-exchange relationship.

5. The machine according to claim 1, wherein said electric heating unit comprises at least one pressure boiler suitable to produce water and steam.

6. The machine according to claim 1, wherein the dispenser of the first unit is pivotally mounted about an vertical axis between at least said first and second delivery positions.

7. The machine according to claim 1, wherein the centrifuge assembly comprises an electric motor coupled to said stirring member by a belt transmission.

8. The machine according to claim 1, wherein the stirring member is provided with an end impeller.

9. The machine according to claim 2, wherein said first heater is fixed to said bearing structure in a heat-exchange relationship therewith.

\* \* \* \* \*